(12) United States Patent
Yamada et al.

(10) Patent No.: US 6,646,570 B1
(45) Date of Patent: Nov. 11, 2003

(54) POINT RETRIEVAL OUTPUT SYSTEM BY A TELEPHONE NUMBER, AND A MEMORY MEDIUM

(75) Inventors: Kunihiro Yamada, Okazaki (JP); Toru Ezaki, Tokyo (JP)

(73) Assignees: Aisin Aw Co., Ltd., Anjo (JP); Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/667,808

(22) Filed: Sep. 22, 2000

(30) Foreign Application Priority Data

Sep. 24, 1999 (JP) .......................................... 11-270161

(51) Int. Cl.$^7$ ............................................. G08G 1/123
(52) U.S. Cl. .................. 340/995.23; 340/988; 701/208; 701/209
(58) Field of Search ................................ 340/988, 990, 340/995, 995.23; 701/201, 208, 207, 209, 211, 212, 213

(56) References Cited

U.S. PATENT DOCUMENTS

| 5,765,123 | A | * | 6/1998 | Nimura et al. | 340/990 |
| 5,784,059 | A | * | 7/1998 | Morimoto et al. | 340/995 |
| 5,941,930 | A | * | 8/1999 | Morimoto et al. | 340/995 |
| 6,041,281 | A | * | 3/2000 | Nimura et al. | 340/990 |
| 6,115,669 | A | * | 9/2000 | Watanabe et al. | 340/995 |

FOREIGN PATENT DOCUMENTS

| DE | 42 19 171 A1 | 1/1993 |
| EP | 0 810 571 A1 | 12/1997 |
| EP | 0 933 744 A2 | 8/1999 |
| JP | 05 313580 | 11/1993 |
| JP | 06 215296 | 8/1994 |

\* cited by examiner

Primary Examiner—Brent A. Swarthout
(74) Attorney, Agent, or Firm—Oliff & Berridge, PLC

(57) ABSTRACT

A guidance system using a telephone number and other information on a subscriber of that telephone number so as to be input and checked, whereby, retrieval and guidance by inputting the telephone number is properly performed. The system has a memory for storing specific information for specifying at least a telephone number and a subscriber and information on a point of the subscriber, an input device means for inputting the specific information for specifying the telephone number and subscriber, a retrieval mechanism for retrieving information on the point of the subscriber on the basis of the telephone number input by input means or specific information for specifying the subscriber, an output controller for controlling an output of information on the point of the subscriber retrieved by retrieval means on the basis of the inputs of the telephone number and the specific information for specifying the subscriber, wherein information is retrieved for a point of the subscriber of the hit telephone number by inputting a telephone number and according to classification of the subscriber whether the subscriber is a private subscriber, a facility, or an entrepreneur of firm, shop or the like. The invention further controls an output of personal information on a condition that a name of the subscriber is input when the subscriber is a private subscriber.

20 Claims, 15 Drawing Sheets (A) Telephone number Data

| | |
|---|---|
| 1 | Telephone number |
| | Point information offset |
| 2 | Telephone number |
| | Point information offset |
| | ⋮ |

Japanese Syllabary Data

| | |
|---|---|
| 1 | Reading |
| | Point Name |
| | Point information offset |
| 2 | Reading |
| | Point Name |
| | Point information offset |
| | ⋮ |

Point Information Data

| | |
|---|---|
| 1 | Telephone number |
| | Reading |
| | Point Name |
| | Address |
| | Point Coordinates (x1,y1) |
| | Identification Flag |
| 2 | Telephone number |
| | Reading |
| | Point Name |
| | Address |
| | Point Coordinates (x2,y2) |
| | Identification Flag |
| 3 | Telephone number |
| | Reading |
| | Point Name |
| | Address |
| | Point Coordinates (x3,y3) |
| | Identification Flag |
| | ⋮ |

(Address)

| |
|---|
| Prefectural Code |
| Municipal District (city, ward, own, village) Code |
| Ooaza (a large section of village) code |
| Koaza (a small section of village) code |
| The following (street, house etc.) codes |

Telephone number Data (For Town Page)

| 1 | Telephone number |
|   | Point information offset |
| 2 | Telephone number |
|   | Point information offset |
|   | ⋮ |

(A) Telephone number Data (For Hello Page)

| 1 | Telephone number |
|   | Point information offset |
| 2 | Telephone number |
|   | Point information offset |
|   | ⋮ |

Point Information Data (For Town Page)

| 1 | Telephone number |
|   | Reading |
|   | Point Name |
|   | Address |
|   | Point Coordinates (x1,y1) |
| 2 | Telephone number |
|   | Reading |
|   | Point Name |
|   | Address |
|   | Point Coordinates (x2,y2) |
| 3 | Telephone number |
|   | Reading |
|   | Point Name |
|   | Address |
|   | Point Coordinates (x3,y3) |
|   | ⋮ |

(Address)

| Prefectural Code |
| Municipal District (city, ward, own, village) Code |
| Ooaza (a large section of village) code |
| Koaza (a small section of village) code |
| The following (street, house etc.) codes |

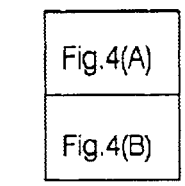

Fig. 4

| Fig.4(A) |
| Fig.4(B) |

POINT RETRIEVAL OUTPUT SYSTEM BY A TELEPHONE NUMBER, AND A MEMORY MEDIUM

BACKGROUND OF THE INVENTION

1. Field of Invention

The invention relates to a point retrieval output system. The point retrieval output system retrieves information for a point, i.e., a location, of a subscriber based on the subscriber's telephone number through a memory medium.

2. Description of Related Art

A telephone number is used for inputting a point, such as a destination, a passage and so on in a navigation system. The navigation system retrieves point coordinates of a point based on the telephone number after the telephone number is input. The navigation system then displays a map with coordinates located at the center of the map. However, because the telephone number is made of an enumeration of numbers, the driver is inconvenienced if a map showing a point other than the one desired by a driver is displayed when the telephone number is recognized as a wrong number or if a wrong telephone number is input. Further, even if a telephone number is correctly input, the driver can only confirm that they have arrived at the desired point by recognizing a signboard, a guide notice or the like of the facility when the driver actually arrives at their desired destination. However, if the telephone number is a private telephone number, the driver is unable to determine if they have arrived at the desired destination as a signboard, guide point, or nameplate is not available at the private destination.

SUMMARY OF THE INVENTION

The invention performs retrieval and guidance by checking additional information for specifying the telephone number and a subscriber.

In various exemplary embodiments of a point retrieval output system for retrieving information on a location of a subscriber based on the corresponding telephone number, the point retrieval system includes a memory means for storing telephone numbers, specific information for specifying subscribers and information on points of the subscribers; input means for inputting a telephone number and specific information in order to specify a subscriber of the telephone number, retrieval means for retrieving information on a point of the subscriber on the basis of the telephone number and the specific information for specifying the subscriber input by the input means; and output control means for controlling output of information on the point of the subscriber retrieved by the retrieval means on the basis of the inputs of the telephone number and specific information for specifying the subscriber.

According to another exemplary embodiment of the invention, the memory means also stores identifying information in order to determine whether the subscriber of the telephone number is a private subscriber. The output control means also judges the identifying information when the telephone number is input and controls an output of information on the point of the subscriber while the specific information for specifying the subscriber is input on the basis of the corresponding telephone number with the identifying information indicating the presence or absence of a restriction, wherein the telephone number of a private subscriber is given a restriction, such as an unlisted number, while the other subscribers are not given a restriction. The output control means also outputs information on the point of the subscriber of the telephone number retrieved under the condition that the identifying information does not include a restriction. The output control means further judges a matching of specific information for specifying the subscriber of the telephone number by inputting specific information for specifying the subscriber under the condition that the identifying information is of a restriction. The output control means also outputs information on the point of the subscriber of the matching telephone number, displays a menu for selecting private home or vicinity of a local telephone exchange number under the condition that the identifying information is restricted, and judges a matching of the specific information for specifying the subscriber of the telephone number by inputting specific information for specifying the subscriber when a private home is input and outputting information on the point of the subscriber of the matching telephone number.

According to another exemplary embodiment of the invention, the memory means stores map data. The output control means also shows a menu for selecting the vicinity of the local telephone exchange number when the telephone number cannot be retrieved by the retrieval means or only the digits for the local telephone exchange number are available. The output control means also outputs a vicinity map when the vicinity of the local telephone exchange number is selected or by inputting an address within the local telephone exchange number. The output control means also allows the inputting of specific information for specifying the subscriber by inputting at least a part of a name of the subscriber with the Japanese syllabary.

According to another exemplary embodiment of the invention, the memory means stores pre-registered point information and the output control means outputs the corresponding point information when the telephone number retrieved by the retrieval means has the point information. The memory means stores at least an address or a name and point coordinates as information on the point of the subscriber and the output control means displays a map on the basis of the point coordinates after the address or name is displayed when information on the point of the subscriber is output. The memory means also stores map data, point information data having at least telephone numbers, readings or point names and point coordinates, telephone number data for retrieving a telephone number and, for example, Japanese syllabary data for retrieving a reading or a point name.

BRIEF DESCRIPTION OF THE DRAWINGS

Various exemplary embodiments of the invention will be described in detail, with reference to the following figures, wherein:

FIG. 3 is a diagram showing an example of a retrieval data structure to be used for a point retrieval output system by a telephone number according to the invention;

DETAILED DESCRIPTION OF THE PREFERRED EMBODIMENTS

Figure 1:
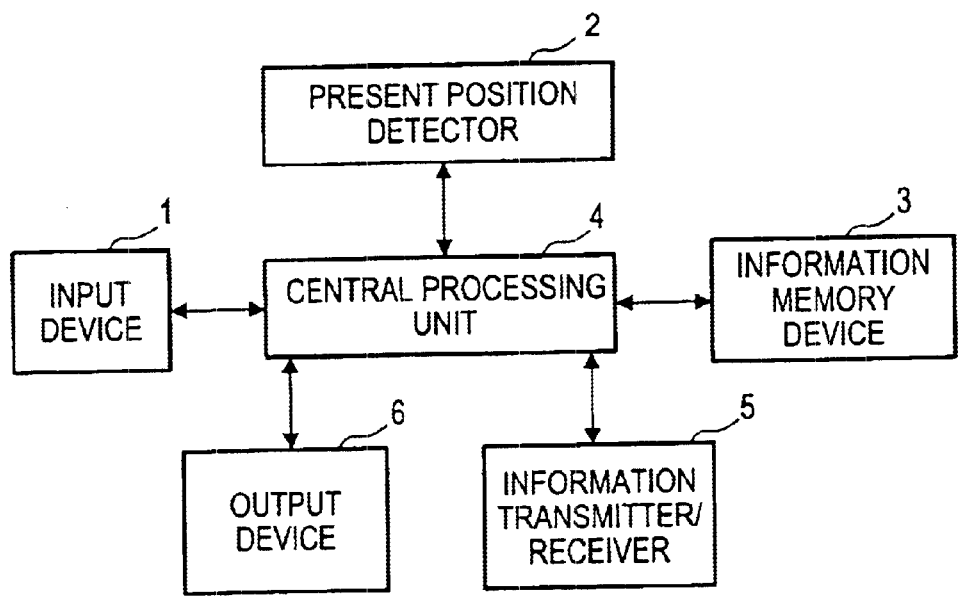
FIG. 1 is a diagram showing an exemplary embodiment of a point retrieval output system by a telephone number according to the invention.

FIG. 1 is a diagram showing a first exemplary embodiment of a point retrieval output system by a telephone number according to the invention. The point retrieval output system includes an input device 1 for inputting information on route guidance; a present position detector 2 for detecting information on a vehicle present position; information memory device 3 for storing therein display/audio guidance data as necessary for route guidance, programs (application and/or OS) and the like; a central processing unit 4 for performing route retrieval processing as a navigator processor, display/voice guidance processing as required for route guidance and to further the entire system control; an information transmitter/receiver 5 for transmitting and receiving information on the vehicle when traveling, (for example, road information or traffic information) and for detecting information on the vehicle present position and further transmitting and receiving information on the vehicle present position, and an output device 6 for outputting information on route guidance.

The input device 1 is provided with functions for inputting a destination and instructing the central processing unit 4 to execute the navigation processing in conformity with a driver's intention. In order to attain the functions, a remote controller, a touch switch, a jog dial or the like for inputting a destination in the form of a telephone number, coordinates on a map etc., or for requesting route guidance can be used. Further, the invention is provided with a voice input device for performing an interaction by voice input. A record card reader can also be used for reading data recorded in an IC card or a magnetic card. Furthermore, a data communication device may be used for data communications between information sources, such as an information center, for accumulating therein data necessary for navigation and providing information via communication links upon the driver's request, and a portable style electronic device having map data, destination data, data of a simple frame map and a building shaped map and the like.

The present position detector 2 is composed of a device for receiving information on the vehicle present position by using the Global Positioning System (GPS), an absolute direction sensor for detecting the travel direction of the vehicle with an absolute direction by using, for example, a geomagnetic sensor, a relative direction sensor for detecting the travel direction of the vehicle by using, for example, a steering sensor and a gyro sensor, and a distance sensor for detecting the travel distance from a number of revolutions of a wheel and the like in various exemplary embodiments.

Figure 6:
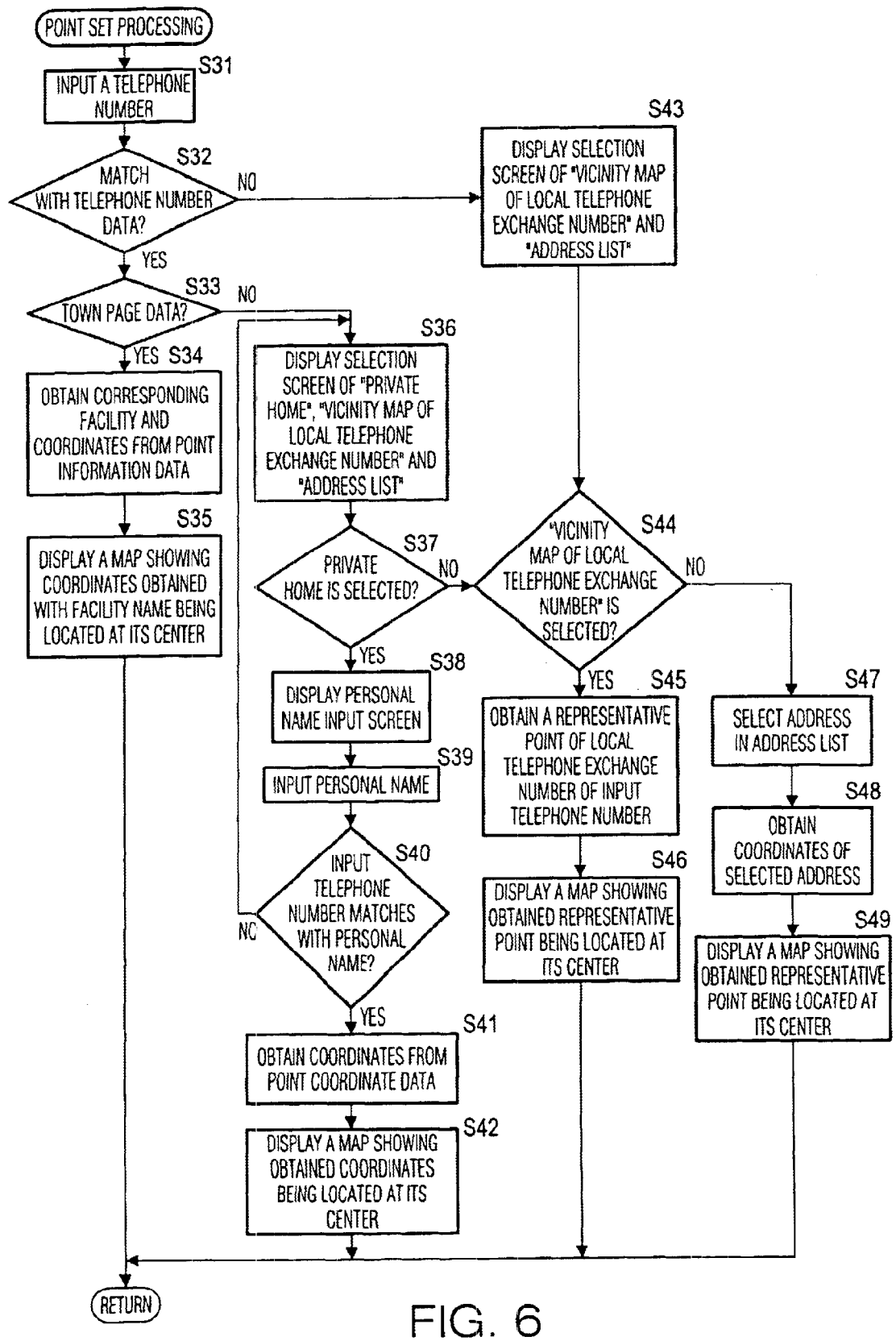
FIG. 6 is a flowchart showing an example of processing for a point setting in the telephone number input mode.

The information memory device 3 is an external storage device in which programs and data for navigation are stored. The information memory device 3 may comprise a CD-ROM and the like. The stored programs therein include a program for performing processing, such as a route search, a processing program, as shown in FIG. 6, a program for performing the display output control necessary for route guidance and performing guidance in the interactive manner by the voice input and the necessary data therefor, and a program for performing the voice output control necessary for the voice guidance and the necessary data therefor. The data to be stored therein are composed of files, such as map data, retrieval data, guidance data, map matching data, destination data, register point data, road data, image data of junction points, genre data, and landmark data, in which all the data necessary for navigation is stored. The map data is divided into each predetermined unit and stored so as to be displayed in rectangular form. In addition, the invention can be applied to a kind of system in which the CD-ROM only stores the data and the central processing unit stores the programs. Here, the CD-ROM is exemplified as the information memory device, however, it may be replaced by an optical disc, such as a DVD-ROM, a magnetic disc, such as a floppy disc, or a magneto-optic disc, such as a MO.

The central processing unit 4 comprises a CPU for performing various calculation processing, a flash memory for reading and storing the programs from the CD-ROM of the information memory device 3, a ROM for storing a program (or program reading means) for checking and updating the programs contained in the flash memory, and a RAM for temporarily storing the searched route guidance information, such as point coordinates of the determined destination, a road name code NO., or data from the calculation processing. The central processing unit 4 further provides a flash memory for storing data in an output device (not shown), such as a display and voice processor, for performing the communication processing by the voice input from the input device 1. The central processing unit 4 also provides for synthesizing a voice, a phrase, a sentence, and a sound read from the information memory device 3 on the basis of the voice output control signals from the CPU and transforming the voice output control signals into analog signals and outputting to the speaker. The central processing unit 4 further provides for a communication interface for transferring the input/output data, a sensor input interface for receiving the sensor signal of the present position detector 2, and a clock for writing the date and time in internal diagnosis information. In addition, the programs for the updating processing may be stored in an external memory device.

The programs according to the invention and the other programs for executing navigation may be wholly stored in a CD-ROM as an external memory medium, or they may be partially or wholly stored in the ROM. The data and programs as stored in the external memory medium, are input as external signals to the central processing unit of the navigation system and processed by a calculation so that the various navigation functions are realized.

As described above, the navigation system embeds therein the flash memory having a relatively large capacity for reading programs from the CD-ROM of the external memory device with the ROM having a small capacity that stores a program (or program reading means) for performing an initiation processing of the CD. The flash memory is a non-volatile memory for maintaining the stored information even if the power is turned off. In order to perform the initiation processing of the CD, the program stored in the ROM or the program reading means is initiated to check the programs stored in the flash memory and read the disc managing information stored in the CD-ROM of the information memory device 3. The loading processing (or updating processing) of the programs is performed by the judgment of this information and the state of the flash memory.

The information transmitter/receiver 5 comprises a GPS receiver for obtaining information by making use of the satellite navigation system (GPS), a VICS receiver for obtaining information by making use of FM multi-channels, electric beacons and light beacons. A data transceiver is exemplified by a portable telephone and a personal computer for exchanging the information with an information center (e.g., ATIS) or other vehicles.

The output device 6 is provided with functions for outputting voice/display guidance information as required by the driver and for outputting the navigation data processed in the CPU 4 to the printer. In order to perform these functions, the output device 6 comprises a memory for drawing data processed in the CPU 4 or data stored in the information memory device 3 in order to display on a screen, a display for displaying image data drawn in the memory, a printer for printing the data processed in the CPU 4 or the data stored in the information memory device 3 and a speaker for outputting route guidance by voice.

The display includes a color CRT or liquid-crystal display device and displays screens showing enlarged intersections, destination names, time, distances, travel direction arrows and the like on the basis of the map data or guidance data to be processed by the CPU 4. Image data to be transmitted to the display are binary image data (bitmap data), and display data or guidance data of the map processed by the CPU 4 received through a communication line used for a serial communication or through the sharing of other communication lines. The data thus received is drawn in the memory within the output system 6, and is thus displayed on the screen.

The display is mounted in the instrument panel in the vicinity of the driver's seat so that the driver is able to confirm the present position of his vehicle and to obtain information on a next route to follow. Moreover, the display may be composed of points or roads which can be input by the touching or the tracing of the screen while making use of a tablet including a touch panel, and a touch screen on the display screen.

Figure 2:
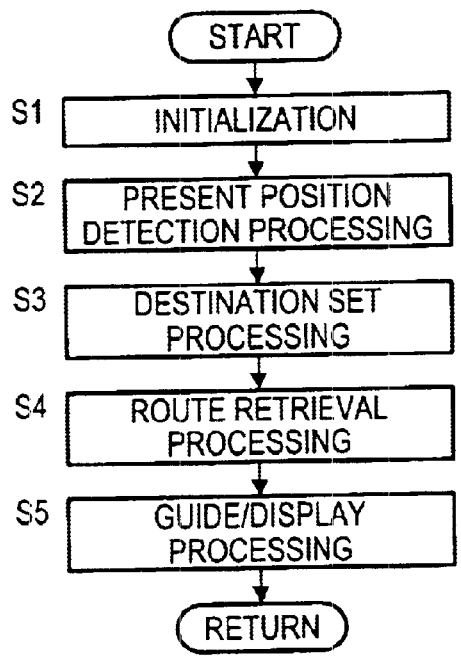
FIG. 2 is a flowchart describing the entire navigation system according to the invention.

FIG. 2 is a flowchart describing the entire navigation system according to the invention. A program for route guidance is initialized S1 as the program is read from the information memory device 3 into the central processing unit 4. A present position S2 is then retrieved by the present position detector 2 and the name of the present position is displayed simultaneously while displaying a vicinity map with the present position being placed at its center. Next, a destination is set S3 by use of a name of the destination, such as area name, facility name, telephone number, address, registered point, road name or the like. A route from the present position to the destination is then retrieved S4. As the route is determined, route guidance/display S5 is repeated until the vehicle reaches the destination while the present position is traced by the present position detector 2. When a stop setting is input before reaching the destination, a retrieval area is set and re-retrieval is performed in that retrieval area and in the same way, route guidance is repeated until the vehicle reaches the destination.

The point retrieval output system by a telephone number according to the invention judges whether a subscriber of the input telephone number is a subscriber of a telephone number without restriction, such as an entrepreneur, or a subscriber of a telephone number given a restriction, such as a private subscriber, when retrieving a point, setting the point and performing guidance in a map by inputting the telephone number. Then, if the subscriber is an entrepreneur, information on a point of that subscriber is output (displaying, guiding and setting a point), and if the subscriber is a private subscriber, information on a point of that subscriber is output under a fixed condition, the fixed position requiring, in various exemplary embodiments, the name of the subscriber to be input. The output of information on the point of the subscriber is carried out as a name of a facility, such as a store, a firm or the like, is displayed when the subscriber is an entrepreneur, or a personal name or an address is displayed when the subscriber is a private subscriber, then a map showing a point of that subscriber being located at its center is displayed. Further, the input of a point, such as a destination or intermediate point is carried out by inputting a point and setting the input point as a destination. If the required condition for the private subscriber is the name of the subscriber, then if the input name of the subscriber matches with the name of the subscriber of the telephone number, the telephone number and the name of the subscriber or the address is displayed with a map thereafter showing a point, which can be set, of that subscriber being located at its center is displayed. If the name of the subscriber does not match, a message or an alarm is output. Further, when the user makes an error in inputting the information, the user can reenter the name of the subscriber or the telephone number once again.

Figure 4B:
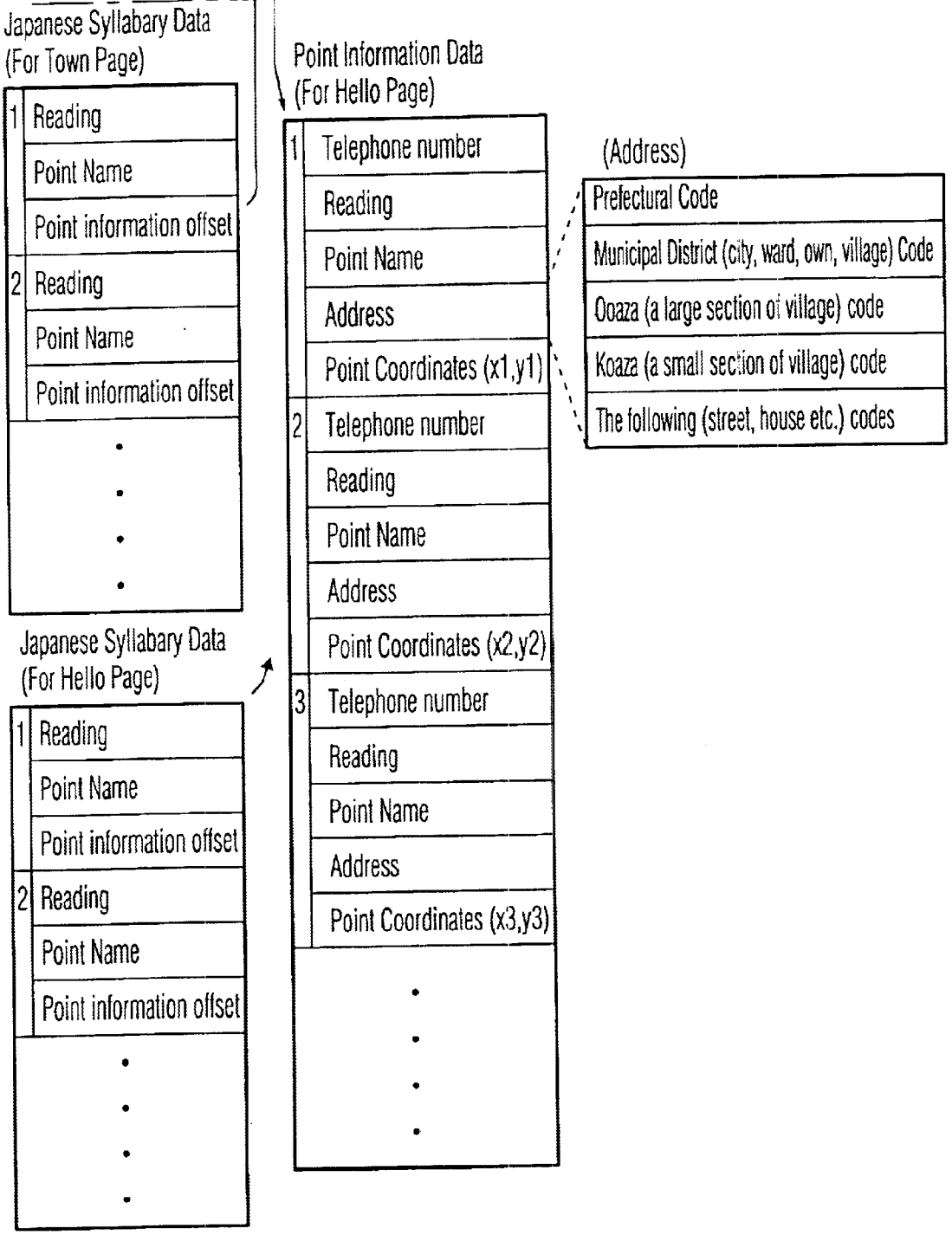
FIG. 4 is a diagram showing an example of a data structure in which data is divided into data for town page and hello page.

FIG. 3 is a diagram showing an example of a data structure (for Japan, other countries would have a similar data structure) to be used for a point retrieval output system by a telephone number according to the invention, and FIG. 4 is a diagram showing an example of a data structure divided into data for the town page and the hello page.

Data to be used for a point retrieval output system according to the invention by a telephone number can include telephone number data, Japanese syllabary or other data as appropriate and point information data as shown in FIG. 3. Further, the telephone number data is data in which telephone numbers and point information data offset are stored. The point retrieval output system retrieves the data when a telephone number is input and point information data is obtained on the basis of point information data offset of that telephone number. The point information data offset can show, for example, stored address and point information data. The telephone number data and point information data are normally retrieval data. Thus, when a telephone number is input, point information data offset of the hit (matching) telephone number is retrieved and various information on the point (point name, address, etc.) is retrieved from the point information data on the basis of that point information data offset and the retrieved information is displayed on a map. The Japanese syllabary data is data in which readings or point names of the subscribers of the telephone numbers, as found in the Japanese syllabary, is stored with the point information data offset, (the data would be in other languages for other countries) wherein the point retrieval output system performs retrieval when a reading or a point name is input and point information data is obtained on the basis of the point information data offset of that reading or point name. Here, the point name is a facility name, a personal name or the like.

Point information data are data in which information on a point of a telephone subscriber, such as point names, addresses, point coordinates (x, y) etc., is stored in the order of telephone numbers or the Japanese syllabary, or by grouping respective addresses as well as identification flags stored therein. When inputting telephone numbers and readings or point names stored in the telephone number data and the Japanese syllabary data, the address is used, for example, in order to output the confirmation information and a code is given to each hierarchy of the address, such as "Aichi-Prefecture" is 23 and "Okazaki-City" is 202. Further, point coordinates are used for example, for displaying a map showing that point being located at its center or displaying that point by putting a mark on the map.

The identification flag is provided to classify subscribers, for example, which classifies whether a subscriber of a telephone number is a subscriber giving restriction, namely, a private subscriber, or giving no restriction, namely, an entrepreneur. Therefore, if according to the telephone directories, data of one of the telephone directories, such as a town page (a name of the registered trademark of NTT, hereafter called), are data of entrepreneurs of facilities, shops, firms and the like so that they are given no restriction, and data of the other telephone directory, such as called a hello page (a name of the registered trademark of NTT, hereafter called), are data of private homes so that they are given restriction, on which identification flags are set. However, the identifying information in order to determine restriction or no restriction may be set on the basis of other classifications or divisions. And, if the telephone number is given no restriction, as mentioned above, point information is immediately provided, and if the telephone number is given restriction, the name of the subscriber is checked and point information is provided according to the hit. Further, when an address is displayed on a screen with letters, it may be structured that the letters are converted from codes by use of a separately stored address database.

FIG. 4 is a set of block diagrams showing an example of the data structure by dividing respectively the above telephone number data, Japanese syllabary data and map information data into data for the town page given no restriction setting and data for the hello page given a restriction setting. In this case, identifying information for classifying whether the data is for the town page or whether the data is for the hello page set as the point information data is not required. Therefore, when such a data structure is used, selecting an input mode, whether it is for inputting a telephone number in the town page or the hello page, namely, whether it is for inputting a telephone number giving no restriction, with the retrieval can be performed by determining an offset of the telephone number on the basis of that selection.

Figure 5:
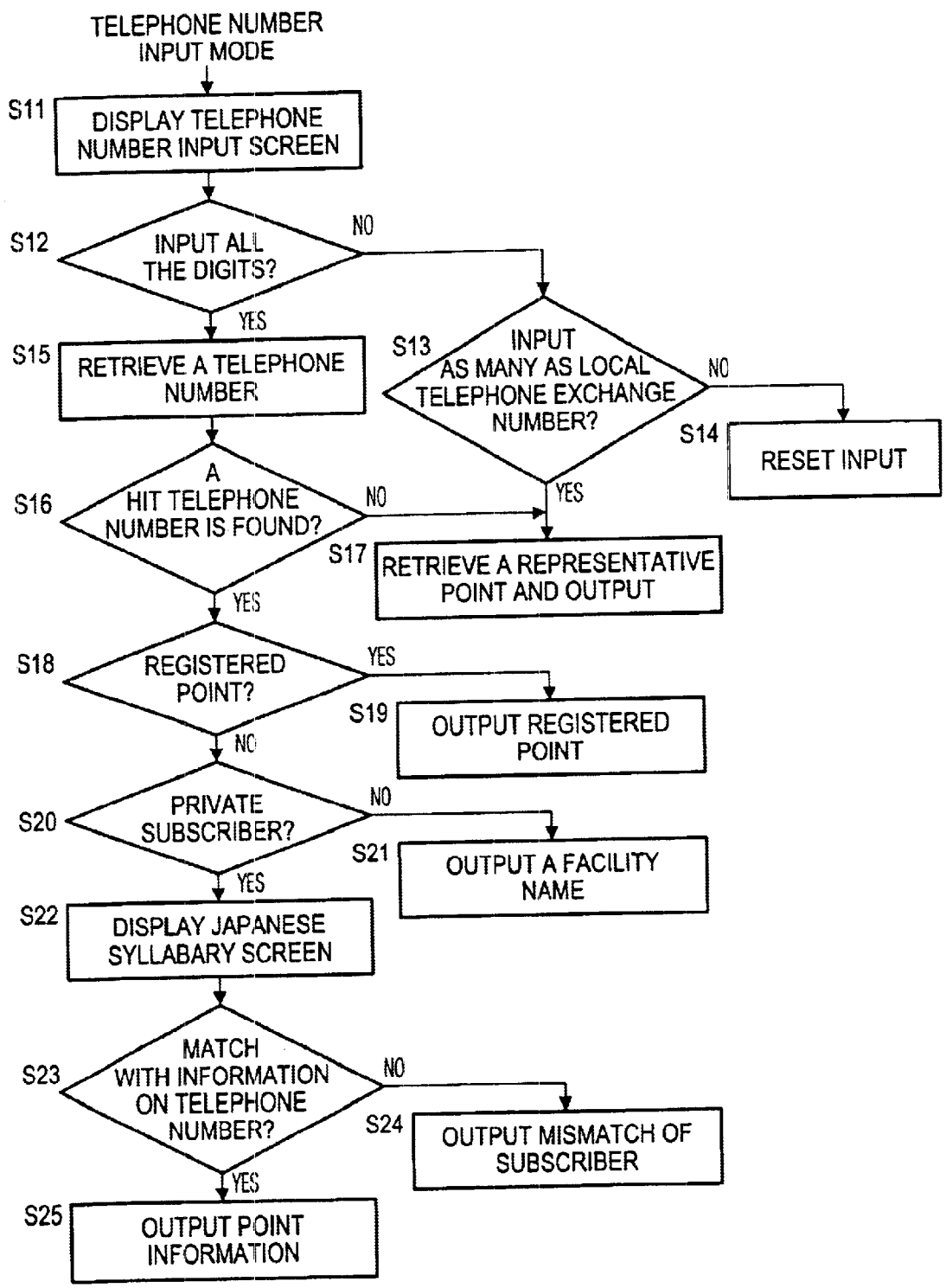
FIG. 5 is a flowchart showing an example of retrieval in the telephone number input mode and guidance processing.

Next, an example of retrieval and guidance processing in the telephone number input mode will be described while making use of the above retrieval data. FIG. 5 is a flowchart showing an example of the retrieval and guidance processing in the telephone number input mode, and FIG. 6 is a flowchart showing an example of point setting processing in the telephone number input mode.

As shown in FIG. 5, the telephone number input mode first displays a telephone number input screen S11, as the telephone number is input, it is then judged whether all the digits, namely 9 or 10 digits of which numbers differ according to areas, are input S12. If all the digits of the telephone number are not input, it is judged whether the number of digits matches the number of digits for the local telephone exchange number S13, if the digits of the telephone number are not input in as many as the digits of the local telephone exchange number, the input is reset S14, for example, and the process returns to a telephone number re-input mode while informing the user with a beeping sound. If the digits of the telephone number are input in as many as the digits of the local telephone exchange number, a representative point is retrieved and information on that point is output S17.

If all the digits of the telephone number are input, retrieval is performed in the telephone number data S15. It is then judged whether a hit telephone number is found S16. If the hit telephone number is not found, a telephone number corresponding to the telephone number that is input in as many as the digits of the local telephone exchange number is used, a representative point is retrieved and information on that point is output S17. If a hit telephone number is found, it is then judged whether the hit telephone number is a registered point S18. If it is a registered point, information on the registered point is output S19, and if it is not a registered point, it is judged whether a subscriber of the telephone number is a private subscriber S20. Additionally, judging whether a point is registered may be performed with reference to a list of the registered points (not shown by a diagram) or identification flags to which information on the registered points are given.

If the subscriber is an entrepreneur, a name or an address of the facility is output S21. If the subscriber is a private subscriber, a screen showing the Japanese syllabary is displayed S22. As a personal name is input, the personal name is checked with a name of the subscriber of the pre-retrieved telephone number and then it is judged whether they match each other S23. If there is a match with the name of the subscriber, point information on the subscriber of the input telephone number is output S25, and if there is not a match with the name of the subscriber, a mismatch of the subscriber is informed with a beeping sound and a message thereof is output S24. With regard to a telephone number input or Japanese syllabary input, several suggestions thereof have been already made by the present applicant, therefore, the description is omitted (see for example, Japanese Patent Laid Open No. Heisei 8-94377 and No. Heisei 9-97226 which are incorporated by reference).

Further, a point set processing by inputting a telephone number is described as follows. As shown in FIG. 6, when a telephone number is input S31, it is judged whether the input number matches with the telephone number data S32. If it matches with the telephone number data, it is further judged whether the matched number is found in the town page data S33. If it is found in the town page data, the corresponding facility name and coordinates are obtained from point information data S34, and a map showing the coordinates obtained with the facility name being located at its center is displayed and a point is set S35.

If the input telephone number is not found in the town page data upon the judgment made at step S33, namely, it is found in the hello page data, a selection screen showing for example, "private home", "vicinity map of local telephone exchange number" and "address list" is displayed S36, and it is then judged whether or not "private home" is selected S37. If "private home" is selected, a personal name input screen is displayed S38, an input processing of the personal name is performed S39 where it is judged whether the input telephone number matches with the personal name S40. If it does not match, processing returns to step S36, and if it matches, coordinates are obtained from map coordinate data S41 and a map showing the obtained coordinates being located at its center is displayed and a point is set S42.

If the input telephone number does not match with the telephone number data, a selection screen of "vicinity map of local telephone exchange number" and "address list" is displayed S43 and it is judged whether "vicinity map of local telephone exchange number" is selected S44. Further, this judgment processing is also performed when "private home" is not selected at step S37.

If "vicinity map of local telephone exchange number" is selected at step S44, representative coordinates of the local telephone exchange number of the input telephone number are obtained S45, and a map showing the obtained coordinates being located at its center is displayed and a point is set thereon S46. Further, if "address list" is selected, an address is selected in the address list S47, coordinates of the selected address are obtained S48, and a map showing the obtained coordinates being located at its center is displayed and a point is set thereon S49.

Figure 7:
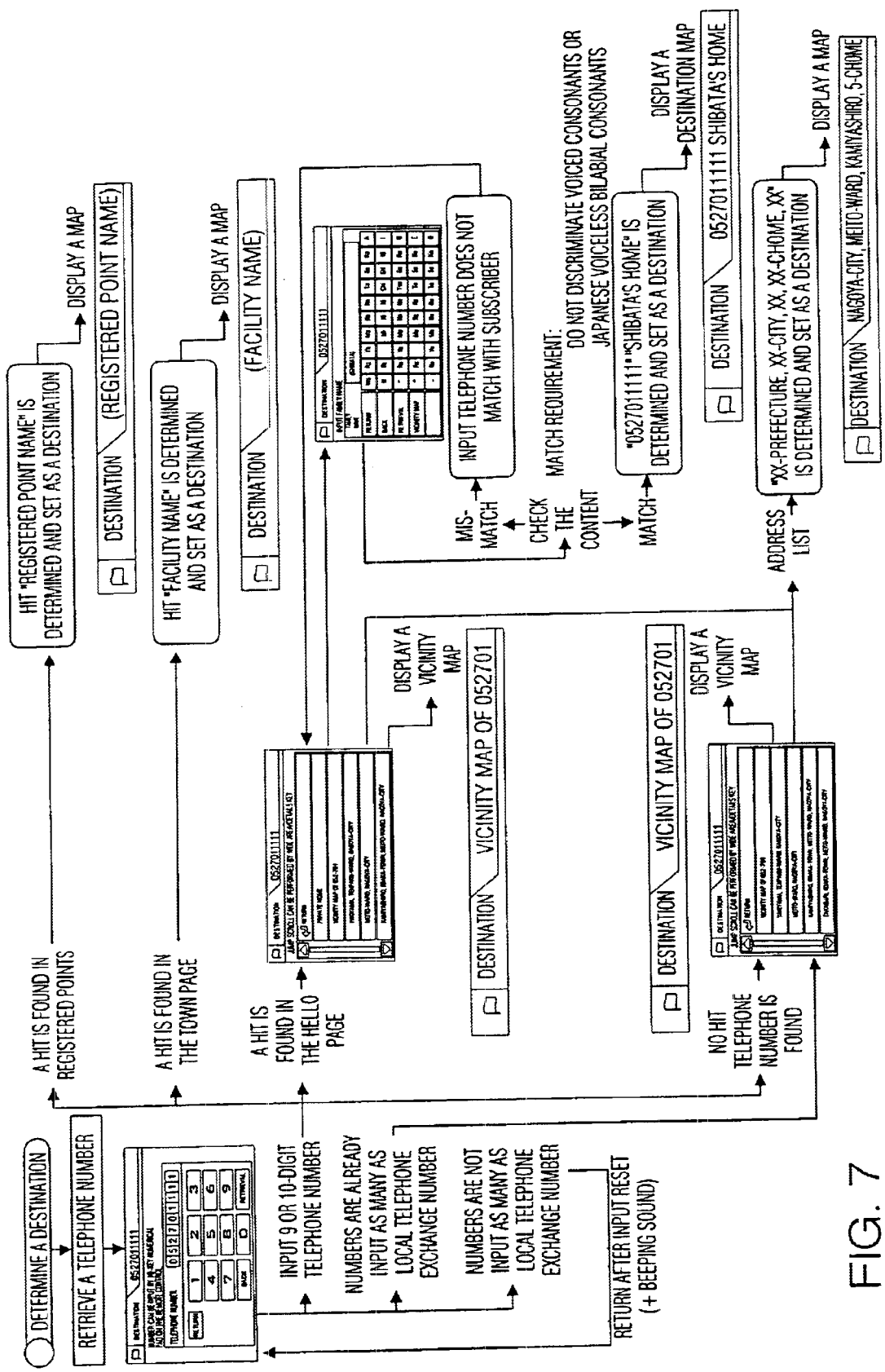
FIG. 7 is a diagram describing an example of a screen change when a destination is determined by a point setting.
Figure 10:
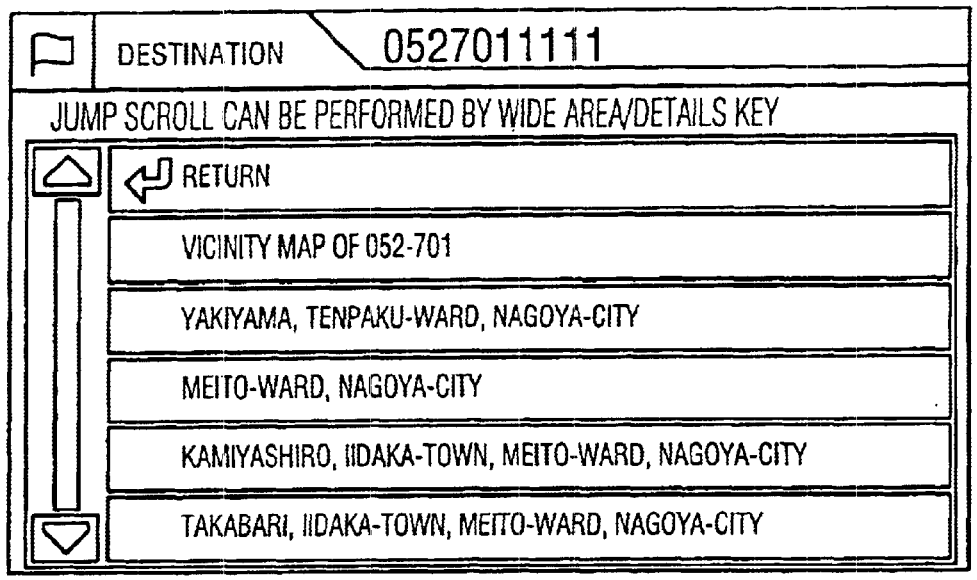
FIG. 10 is a diagram showing an example of section screen to be displayed when no hit is found or a number of digits is input as many as the local telephone exchange number.
Figure 11:
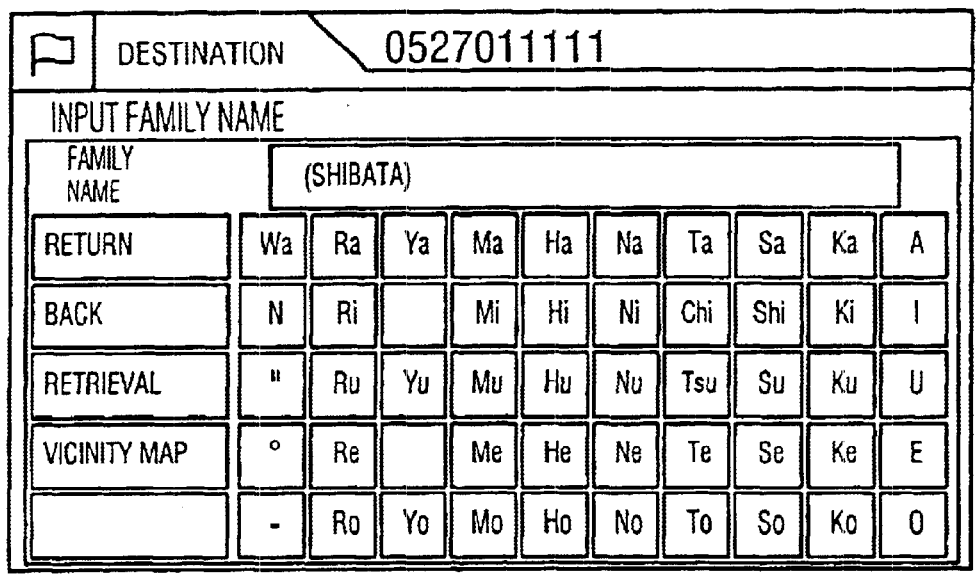
FIG. 11 is a diagram showing an example of a Japanese syllabary screen.
Figure 12:
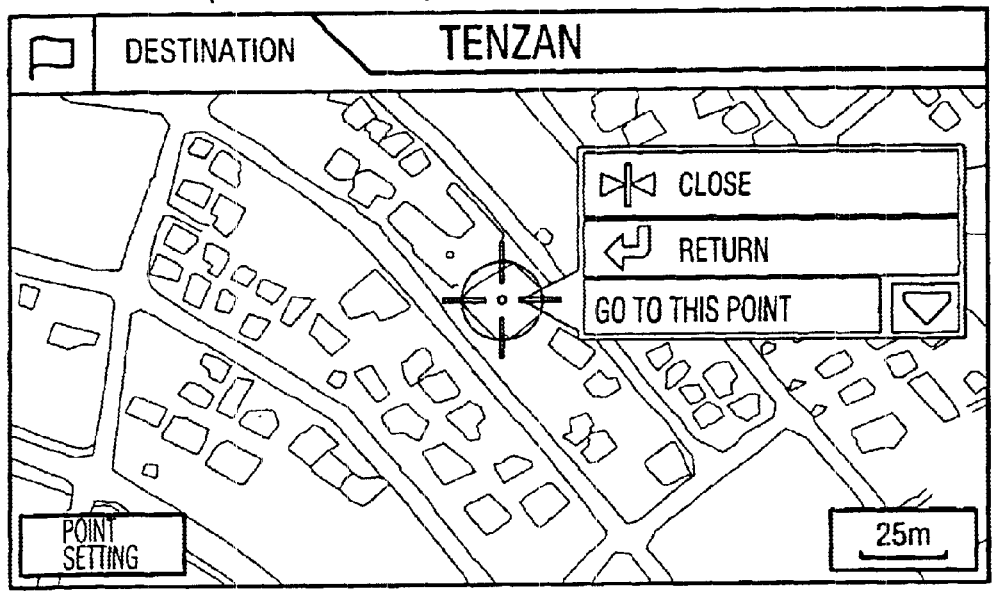
FIG. 12 is a diagram showing an example of map display screen for displaying a facility name.
Figure 13:
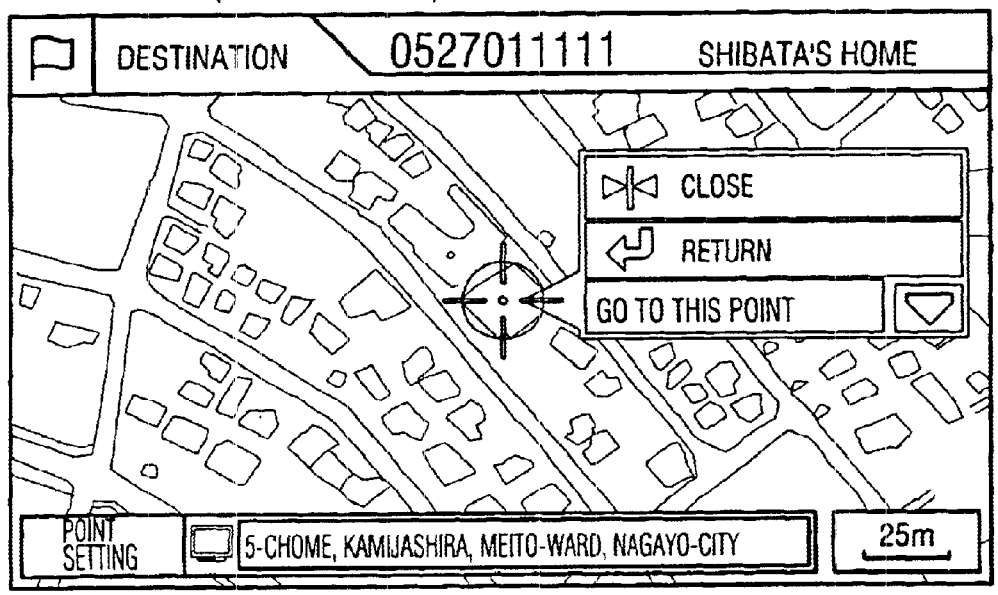
FIG. 13 is a diagram showing an example of map display screen for displaying a private home.
Figure 14:
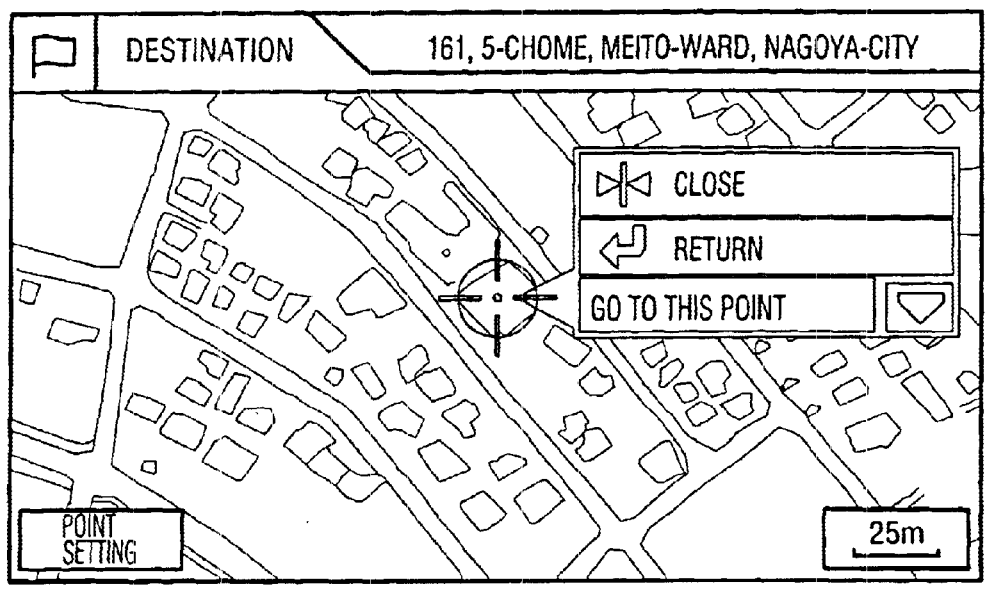
FIG. 14 is a diagram showing an example of map display screen for displaying an address with a pinpoint.
Figure 15:
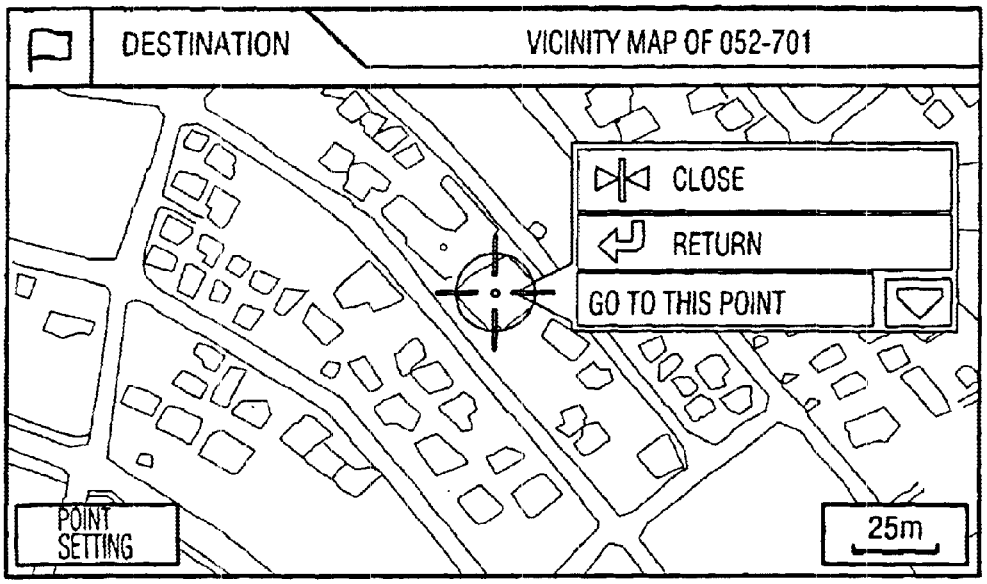
FIG. 15 is a diagram showing an example of vicinity map display screen for displaying a vicinity map on the basis of representative coordinates.

The invention is further described on the basis of concrete screens and exemplary embodiments of those screen changes. FIG. 7 is a diagram describing exemplary embodiments of the screen changes when a destination is determined by a point setting, FIG. 8 is an exemplary embodiment of telephone number input screen, FIG. 9 is a diagram showing an exemplary embodiment of a selection screen to be displayed when a hit telephone number is found in the hello page, FIG. 10 is a diagram showing an exemplary embodiment of a selection screen to be displayed when no hit telephone number is found or digits of the telephone number are input in as many as the local telephone exchange number, FIG. 11 is a diagram showing an exemplary embodiment of Japanese a syllabary screen, FIG. 12 is a diagram showing an exemplary embodiment of a map display screen for displaying a facility name, FIG. 13 is a diagram showing an exemplary embodiment of a map display screen for displaying a private home, FIG. 14 is a diagram showing an exemplary embodiment of a map display screen for displaying an address with a pinpoint, and FIG. 15 is a diagram showing an exemplary embodiment of a vicinity map display screen for displaying a vicinity map on the basis of representative coordinates.

Figure 8:
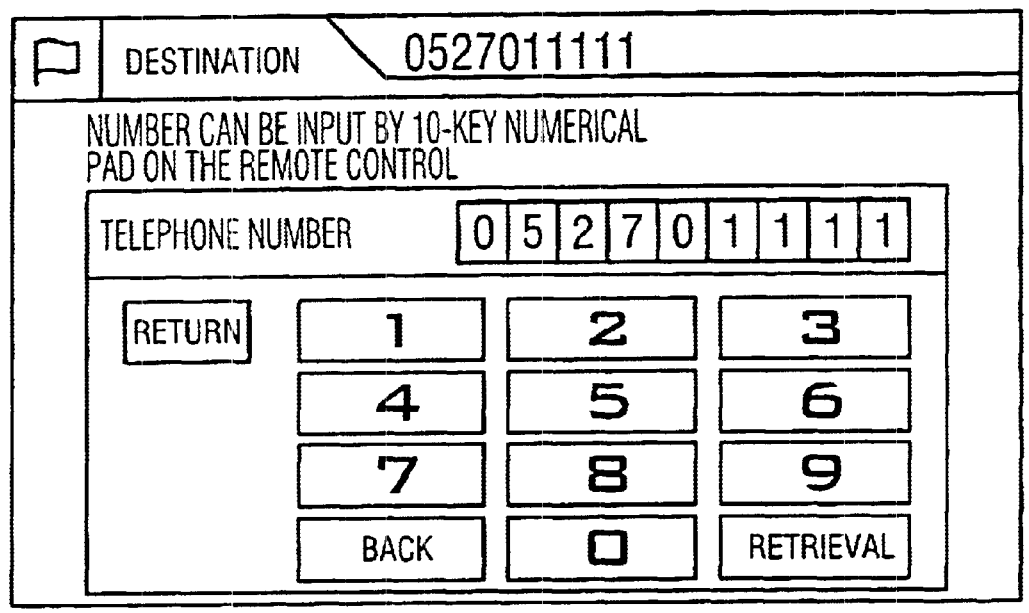
FIG. 8 is an example of a telephone number input screen.

In the telephone number input mode, a telephone number input screen as shown in FIG. 8 is displayed. The telephone number input screen is divided into respective areas comprising a message area, an input display area and a keypad input area. Therein, "Number can be input by 10-key numerical pad on the remote control," is displayed in the message area, the input telephone number "0527011111" is displayed in the input display area, and the 10-key numerical pad for inputting numbers, return key for returning to a previous screen or mode, back key for backing up or erasing the digits for re-inputting in case of an improper input and a retrieval key for starting retrieval of the input sequence of numbers as a telephone number are set and displayed. In this screen, as numbers are input by the 10-key numerical pad and retrieval key is input, retrieval is started, and the following step branches off depending on the input numbers whether they are 9 or 10 digits, or whether they are input as many as the digits of the local telephone exchange number as shown in FIG. 7.

When a 9 or 10-digit number is input, the following processing is performed according to whether a hit telephone number is found in any of the registered points, or whether the town page and the hello page or no hit telephone number is found. As shown in FIG. 7, if a hit is found in the registered points, a destination setting is made with a registered point name and the telephone number input screen is changed to a destination map display screen. If a hit is found in the town page, a destination setting is made with a facility name and the screen is changed to a destination map display screen as shown in FIG. 12. If a hit is found in the hello page, the screen is changed to a selection screen shown in FIG. 9 and if no hit is found, the screen is changed to a selection screen shown in FIG. 10. Further, if the number of the digits is input in as many as the local telephone exchange number, the screen is changed to the selection screen shown in FIG. 10 and if the number is not input as many as the local telephone exchange number, a beeping sound is output and the input is reset and thereafter returns to a processing of the telephone number input screen shown in FIG. 8.

Figure 9:
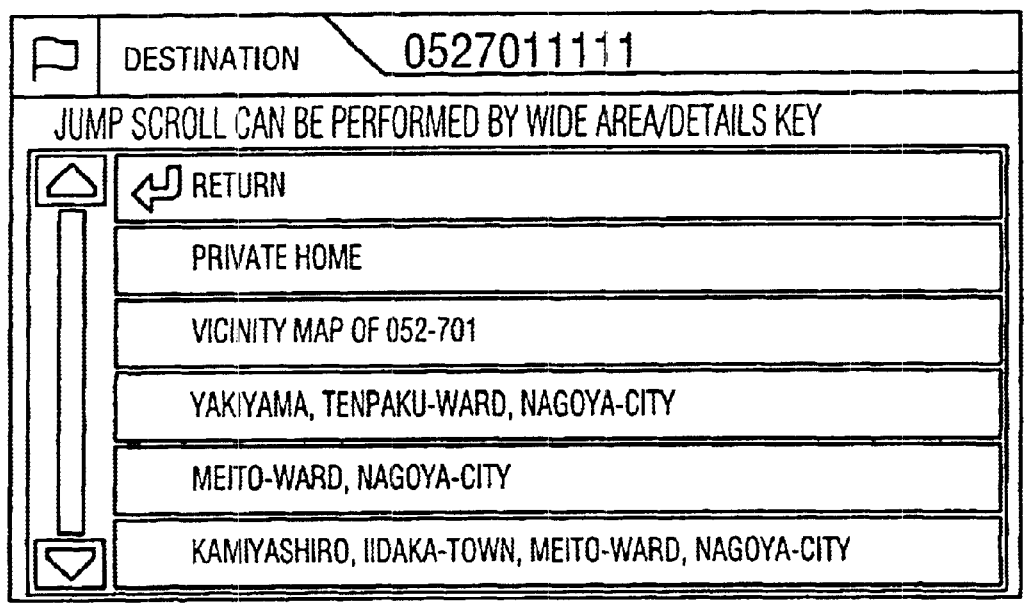
FIG. 9 is a diagram showing an example of a selection screen to be displayed when a hit telephone number is found in the hello page.

The selection screen shown in FIG. 9 is displayed when a hit is found in the hello page. The selection screen, is a screen to select whether a map of a private home is displayed, a vicinity map of the local telephone exchange number (052-701) is displayed or a map of an address by selecting the address within the area since the telephone number is a telephone number of a private subscriber giving restriction in providing information. At this stage, "private home" is selected and the screen is changed to a Japanese syllabary input screen (shown using English equivalents) shown in FIG. 11. If family name, full name or the first letter of the subscriber name is input by Japanese syllabary in the Japanese syllabary screen, a matching between the telephone number and the subscriber name is judged. As shown in FIG. 13, a pin point is then displayed in a map with the telephone number, the subscriber name, and the address according to that matching. Therefore, a destination is determined upon selecting "go to this point". However, if there is a mismatch with the telephone number subscriber, a return is made to the selection screen shown in FIG. 9 after displaying a message such as "the input telephone number does not match with a subscriber".

Further, if "vicinity map of 052-701" is selected in the selection screen shown in FIG. 9, the screen is changed to a vicinity map of the local telephone exchange number display screen shown in FIG. 15 and if "address list" is selected, the screen is changed to a map display screen shown in FIG. 14 in which a destination can be set by an address comprising prefecture, city, town, village, number, ooaza (a large selection of village), koaza (a small selection of village), lot number and the like. Although the invention is being described in the context of use in Japan, the system is adaptable to other languages and geographic or political descriptions. A screen change by selecting "vicinity map" or "address list" is the same as a screen change made from the selection screen shown in FIG. 10.

Figure 16:
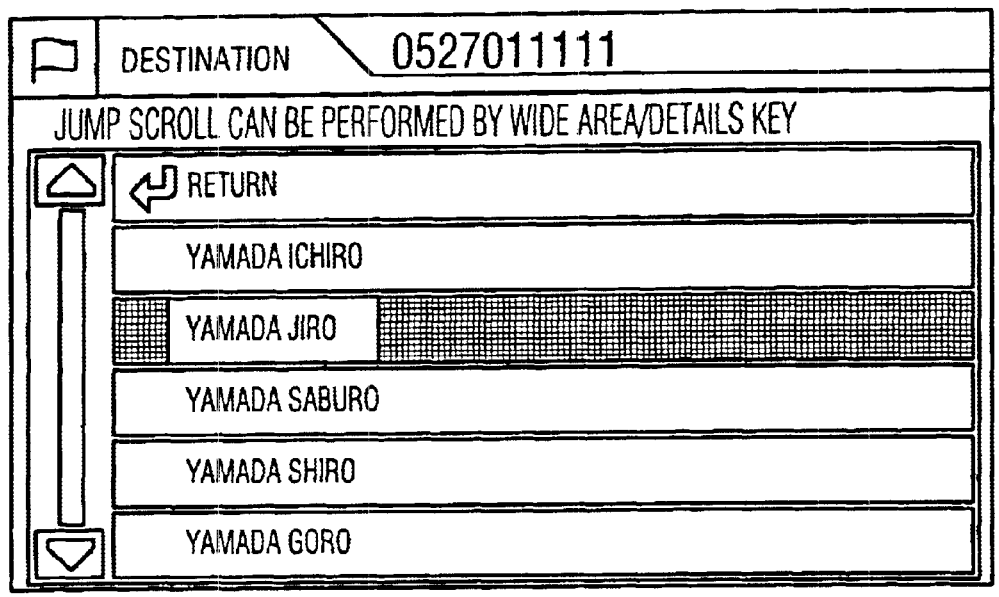
FIG. 16 is a diagram showing an example of a list of same family names to be displayed if a hit is found in private homes.
Figure 17:
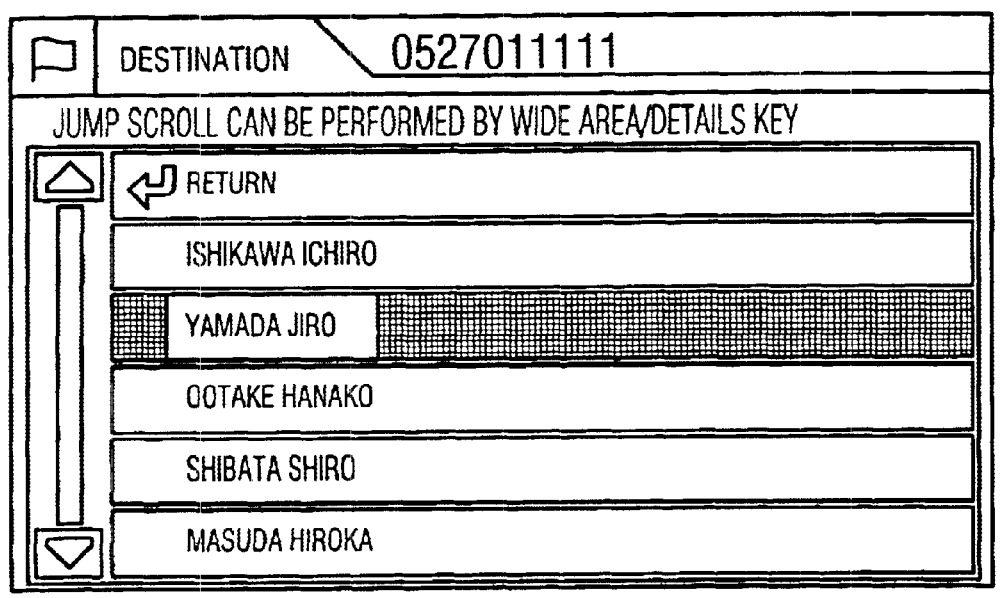
FIG. 17 is a diagram showing an example of a list of neighboring private homes if a hit is found in private homes by inputting a telephone number.
Figure 18:
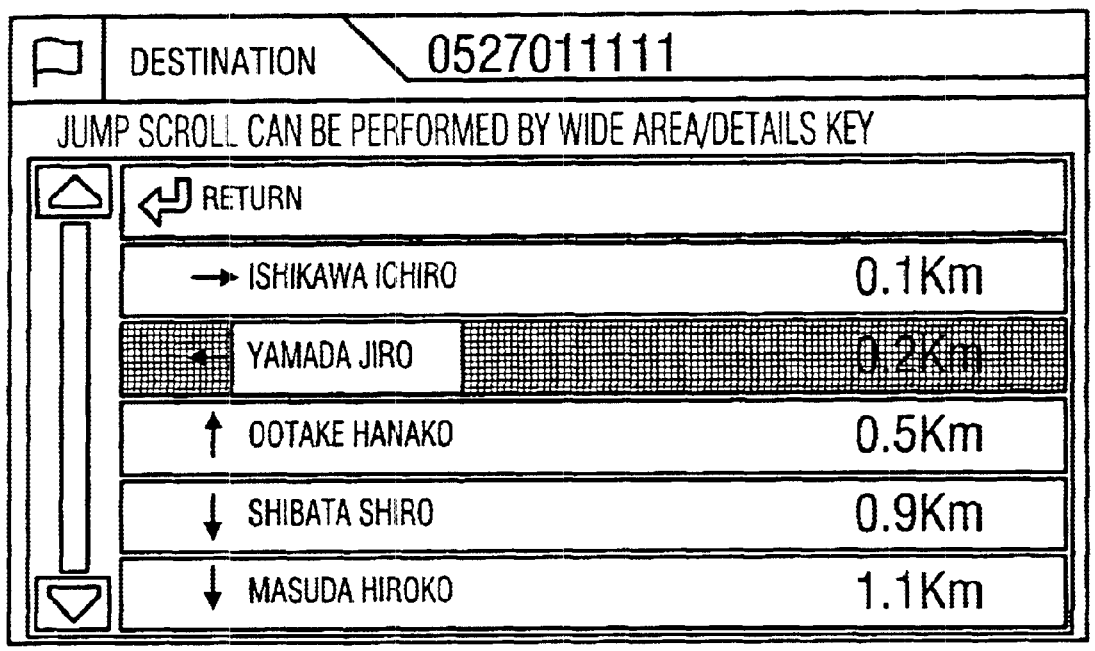
FIG. 18 is a diagram showing an example when distances and directions from a specific point are added to a list shown in FIG. 17.
Figure 19:
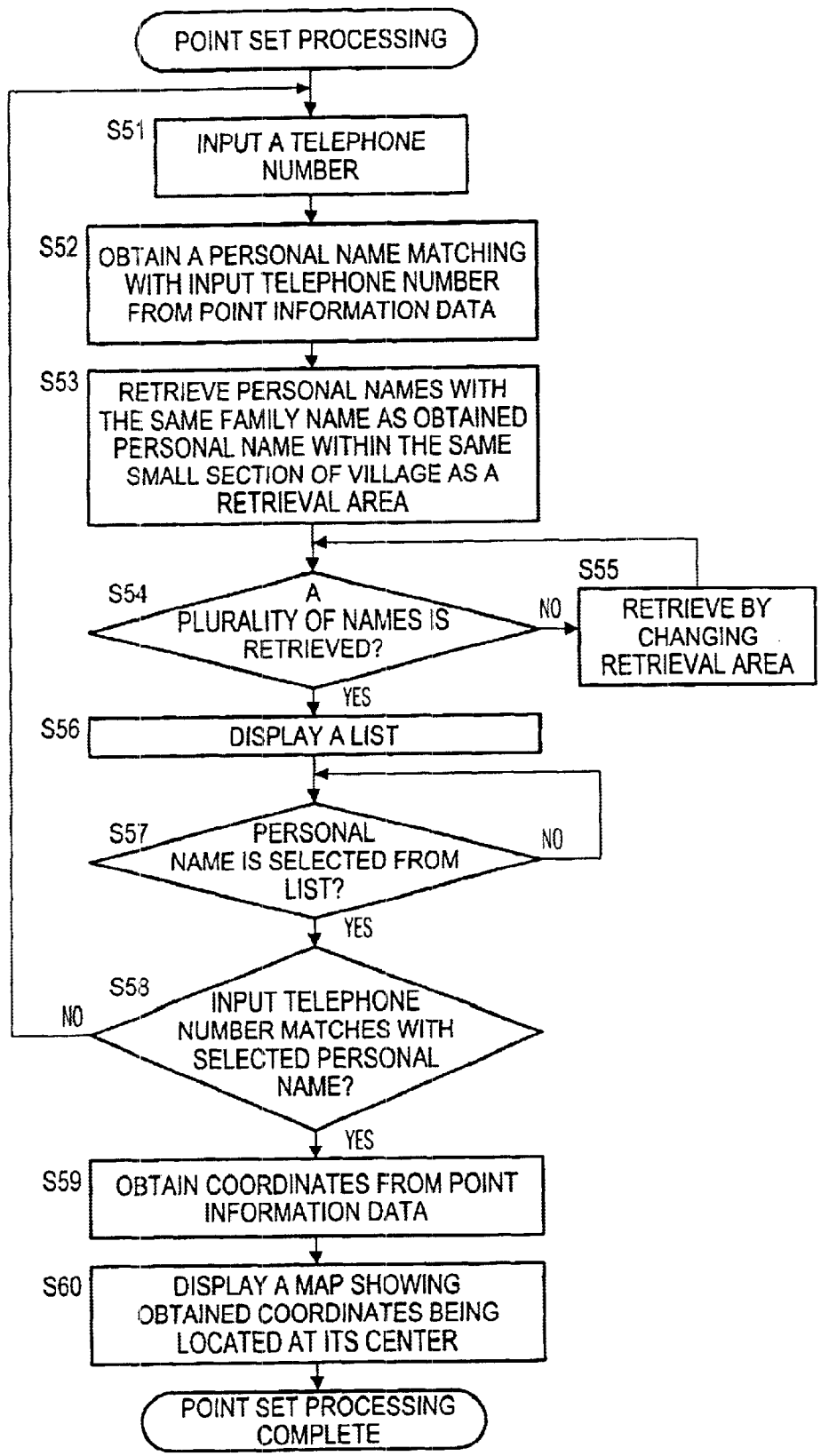
FIG. 19 is a flowchart describing an example of processing when a list of same family names is output.
Figure 20:
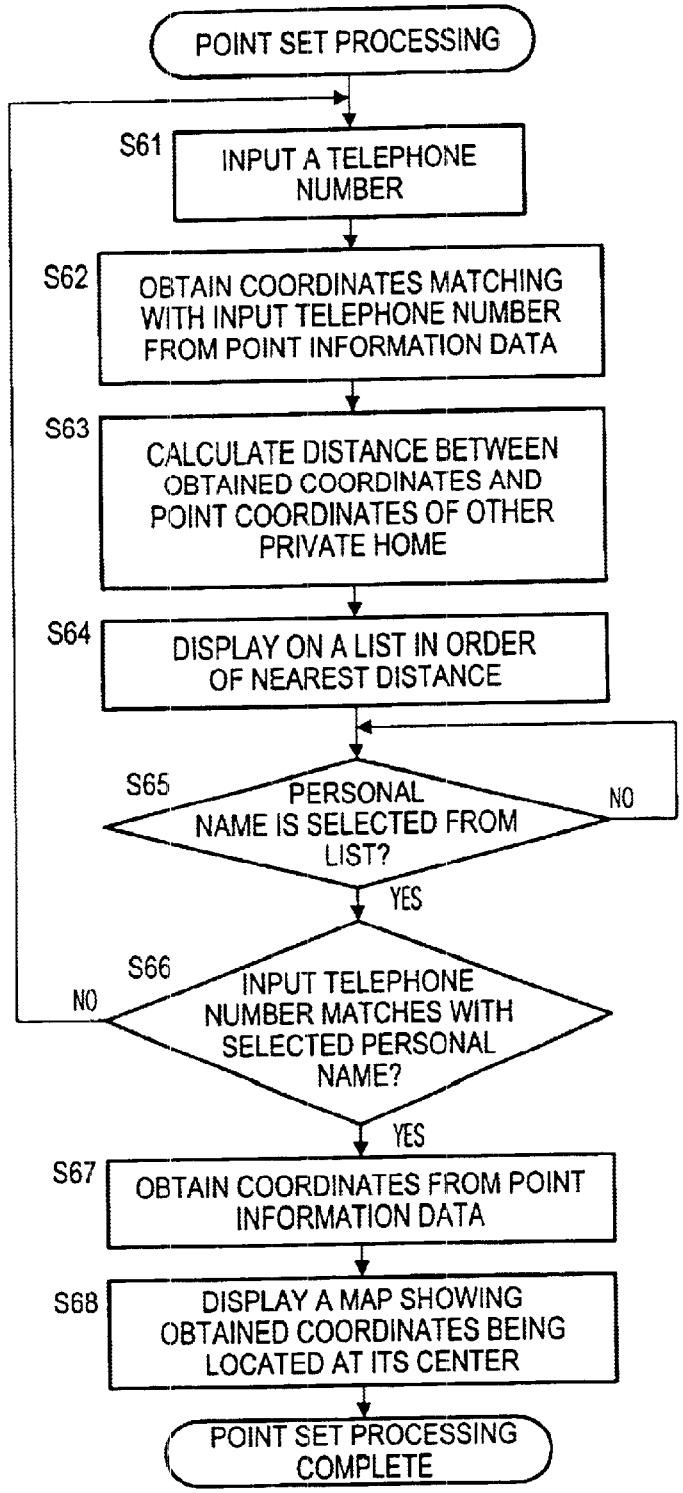
FIG. 20 is a flowchart describing an example of processing when a list of neighboring private homes is output.

FIG. 16 is a diagram showing an exemplary embodiment of a list of the same family name to be displayed if a hit is found in private homes, FIG. 17 is a diagram showing an exemplary embodiment of a list of neighboring private homes, FIG. 18 is a diagram showing an exemplary embodiment when distances and directions from a specific point are added to the list shown in FIG. 17, FIG. 19 is a flowchart describing an exemplary embodiment of processing when a list of the same family names is output and FIG. 20 is a flowchart describing an exemplary embodiment of processing when a list of neighboring private homes is output.

According to the above, when retrieval is performed by inputting a telephone number, if a subscriber of the telephone number is given a restriction, a subscriber name, a first letter, or a family name is input and a point of the subscriber of the input telephone number is displayed in a map with a pinpoint on the basis of the match between the input item and the subscriber of the input telephone number. However, in this case, it may be performed by displaying a list and inputting a designated item from the list, instead of the Japanese syllabary input. In various exemplary embodiments, when a subscriber name is input, similar names or same family names as shown in FIG. 16 are retrieved in the vicinity and displayed in a list and if a subscriber name is different from the subscriber name of the input telephone number that is designated and input, mismatch processing is performed. Therefore, if a plurality of items can not be retrieved in a certain area, the area may be enlarged gradually from koaza ooaza→city→town→village→prefecture or by koaza→neighboring koaza in a circle, a rectangle or a polygon with the point of the corresponding telephone number subscriber being located at its center.

Further, if a hit is found in private homes by the telephone number input, a plurality of private homes in the vicinity of the hit private home may be retrieved and a list thereof may be displayed as shown in FIG. 17. Further, a list may be displayed with distances and directions from a specific point as shown in FIG. 18. Of course, in addition to the list, respective points may be displayed on a map. When a hit is found in the private homes, an address, an initial, a first letter, a postal code or the like may be used as specific information instead of a name of a private home since the purpose of the specific information for specifying the subscriber is constructed so as to release restrictions on a telephone number of the subscriber and thus concrete information is provided by the matching between the specific information and the subscriber. The neighboring retrieval area may be based on a simple distance from the hit private home or a distance from the hit private home within a town.

A processing is performed when a list of the same family names is output as above. A telephone number is input S51 as shown in FIG. 19, a personal name corresponding to the input telephone number is obtained from point information data S52, and personal names of the same family name as the obtained personal name are retrieved within the same small section of a village as a retrieval area S53. It is then judged whether a plurality of personal names are retrieved S54. If a plurality of personal names is not retrieved, the retrieval area is changed until a plurality of names is retrieved S55 and when a plurality of personal names is retrieved, a list thereof is displayed S56. Then, it is judged whether a personal name is selected from the list S57. It is also judged whether a subscriber of the input telephone number matches with the selected personal name S58. If mismatched, a return is made to step S51 for inputting a telephone number again and if matched, coordinates are obtained from point information data S59, a map showing the obtained coordinates being located at its center is displayed S60 and point setting processing is completed. Further, if mismatched, processing may return to a selection screen shown in FIG. 9.

A processing is performed when a list of neighboring private homes is output. In various exemplary embodiments, a telephone number is input S61, coordinates corresponding to the input telephone number are obtained S62, distances from the obtained coordinates to point coordinates of other private homes within a predetermined area are calculated S63 and a list of private homes is displayed in order of the shortest distance S64. Then, it is judged whether a personal name is selected from the list S65. It is further judged whether the subscriber of the input telephone number matches with the selected personal name S66. If mismatched, a return is made to step S61 for inputting a telephone number again and if matched, coordinates are obtained from point information data S68 and point setting processing is completed. Further, if mismatched, processing may return to a selection screen shown in FIG. 9.

The invention is not limited to the above exemplary embodiments, various changes can be made. For example, in the above exemplary embodiments, a telephone number and a reading or a point name, an address, point coordinates, identifying information are stored as point information data. Guide information such as a content, a type of business may be stored if a subscriber is a store, or guide information is separately stored and offset information of that guide information may by stored in the point information data. Further, identifying information is stored in the point information data, however, it may be stored in telephone number data or it may be structured such that subscribers are divided into several classifications, such as private, registered, public facility, store, and identifying information is set according to the classifications.

Further, it is described that a full name, a family name, or a first letter is input by the Japanese syllabary when a subscriber name is input. However, if any information that can specify a subscriber together with a telephone number, such as a private home, can be used, such as a name, Kanji (Chinese characters), Roman letters, an initial, a first name, a middle name, a family name, an address, prefecture, a state name, a city name, a town name, a street name, a postal code, sex, a blood type, birthday, one's company, one's school, e-mail address (complete address inclusive of @), an identification number or the like, which may be used as specific information for specifying a subscriber.

Further, according to the invention, an input telephone number is retrieved in the telephone number data and a subscriber name of the input telephone number is checked if the subscriber is a private subscriber, therefore, identifying information may be stored in the telephone number data. If the subscriber is a private subscriber, specific information of the private subscriber may be stored with the identifying information in the telephone number data. In this manner, whether a subscriber is a private subscriber is immediately identified and, further, when a name of the subscriber is required to be checked, it can be checked merely by making retrieval in the telephone number data. Further, Japanese syllabary data may be used as facility name retrieval data. Official names and popular names or nicknames are stored respectively in reading data, such as "Nagoya Tetsudd" and "PJleitetsu" (Nagaya Railway), "Kansai Kokusai Kuko" and "Kanku" (Kansai International Airport), thus retrieval can be made by inputting any names.

As it is obvious from the above descriptions, the invention is a point retrieval output system by a telephone number for retrieving information on a point of a subscriber of the corresponding telephone number and output, comprising a memory for storing specific information for specifying at least a telephone number and a subscriber and information on a point of the subscriber, an input device for inputting specific information for specifying a telephone number or a subscriber, a retriever for retrieving information on the point of the subscriber on the basis of the telephone number to be input by the input means and the specific information for specifying the subscriber, and an output controller for controlling an output of information on the point of the subscriber retrieved by the retriever on the basis of the input of the telephone number and the specific information for specifying the subscriber. Thus, it is no longer a problem that a point different from a point desired by the user is displayed and guided if a telephone number is wrongly input. Further, when information on the point of the subscriber is output, the user is relieved about having to proceed to his/her desired point and to confirm that the information is correct. Further, if the telephone number subscriber is a private subscriber, information is not socially opened in public, therefore, retrieval is automatically and unconditionally performed from the input private telephone number and personal information thereon is output. However, the invention judges whether the input telephone number matches with the specific information for specifying a subscriber and to control the personal information is output only if there is a match, thus allowing privacy to the subscriber.

What is claimed is:

1. A point retrieval output system for inputting a telephone number and retrieving and outputting information on a point of a subscriber of the telephone number, comprising:

memory means for storing at least telephone numbers, specific information for specifying the subscribers and information on the points of the subscribers;

input means for inputting either the telephone number or the specific information for specifying the subscriber by a user who rides in a vehicle;

retrieval means for retrieving information on the point of the subscriber on the basis of either the telephone number or the specific information for specifying the subscriber input by the input means; and output control means for controlling an output of information on the point of the subscriber retrieved by the retrieval means on the basis of the inputs from the input means by the user who rides in the vehicle of both the telephone number and specific information for specifying the subscriber.

2. The point retrieval output system of claim 1, wherein the memory means stores identifying information for classifying the subscriber of the telephone number, the output control means judges the identifying information when the telephone number is input and controls the output of information on the point of the subscriber under the condition that specific information for specifying the subscriber is input on the basis of the judgment.

3. The point retrieval output system of claim 2, wherein the identifying information is indicative of presence and absence of restriction, wherein a telephone number of private subscriber is given a setting of restriction and a telephone number other than telephone numbers of the private subscribers is given a setting of no restriction.

4. The point retrieval output system of claim 3, wherein said output control means outputs information on the point of the subscriber of the telephone retrieved under the condition that the identifying information is of no restriction.

5. The point retrieval output system of claim 3, wherein said output control means judges a matching of the specific information for specifying the subscriber of the telephone number by inputting the specific information for specifying the subscriber of the telephone number under the condition that the identifying information is of restriction and output the information on the point of the matching subscriber.

6. The point retrieval output system of claim 3, wherein the output control means display a menu for selecting private home or vicinity of a local telephone exchange number under the condition that the identifying information is of a restriction.

7. The point retrieval output system of claim 6, wherein a matching of the specific information for specifying the subscriber of the telephone number by inputting the specific information for specifying the subscriber is judged.

8. The point retrieval output system of claim 1, wherein the output control means display a menu for selecting the vicinity of a local telephone exchange number when the telephone number can not be retrieved or the telephone number is input only in as many as the local telephone exchange number.

9. The point retrieval output system of claim 6, wherein the memory means stores map data and the output control means outputs a vicinity map when either the vicinity of the local telephone exchange number is selected or a vicinity map by inputting the address within the local telephone exchange number is selected.

10. The point retrieval output system of claim 8, wherein the memory means stores map data and the output control means outputs a vicinity map when either the vicinity of the local telephone exchange number is selected or a vicinity map by inputting the address within the local telephone exchange number is selected.

11. The point retrieval output system of claim 5, wherein the input of the specific information for specifying the subscriber includes at least a part of a name of the subscriber.

12. The point retrieval output system of claim 8, wherein the input of the specific information for specifying the subscriber includes at least a part of a name of the subscriber.

13. The point retrieval output system of claim 1, wherein the memory means stores identifying information for classifying the subscriber of the telephone number.

14. The point retrieval output system of claim 13, wherein the identifying information is information for classifying whether the subscriber is a private subscriber.

15. A point retrieval output system of claim 1, wherein when the memory means store preregistered point information and the output control means outputs that point information when the telephone number retrieved by the retrieval means has the point information.

16. The point retrieval output system of claim 1, wherein the memory means stores map data, at least either an address or name as information on the point of the subscriber and point coordinates, and the output control means displays a map on the basis of the point coordinates after either the address or name is displayed when information on the point of the subscriber is output.

17. The point retrieval output system of claim 1, wherein the memory means stores point information data having at least telephone numbers, either readings or point names addresses and point coordinates, telephone number data for retrieving a telephone number and Japanese syllabary data for retrieving either a reading or a point name.

18. A point retrieval output system for inputting a telephone number and retrieving and outputting information on a point of a subscriber of the telephone number, comprising:

memory means for storing map data and at least telephone numbers, names of subscribers and point coordinates of the subscribers;

input means for inputting either the telephone number or a name of the subscriber by a user who rides in a vehicle;

retrieving means for inputting either the telephone number or the name of the subscriber input by the input means; and output control judgment means for judging a matching of the telephone number and name of the subscriber by inputting from the input means by the user who rides in the vehicle both the telephone number and name of the subscriber and displaying a map on the basis of the point coordinates of the subscriber to be retrieved by said retrieval means when they match.

19. A point retrieval output system for inputting a telephone number and retrieving and outputting information on a point of a subscriber of the telephone, comprising:

memory means for storing at least telephone numbers, specific information for specifying the subscribers and information on the points of the subscribers;

input means for inputting either the telephone number or the specific information for specifying the telephone number or subscriber by a user who rides in a vehicle;

retrieval means for retrieving information on the point of the subscriber on the basis of either the telephone number or the specific information for specifying the subscriber input by the input means;

output control means for controlling an output of information on the point of the subscriber retrieved by the retrieval means on the basis of the inputs from the input means by the user who rides in the vehicle of both the telephone number and specific information for specifying the subscriber; and point setting means for setting information on the point of the subscriber output by said output control means as a guide destination.

20. A computer readable memory medium in which data for the point retrieval output system by a telephone number for retrieving information on a point of a subscriber of the telephone number upon an input of the telephone number and programs are stored, wherein the computer readable memory medium in which data having at least the telephone number, specific information for specifying the subscriber and information on the point of the subscriber;

a retrieval program for realizing a function for retrieving information on the point of the subscriber on the basis of the telephone number and specific information for specifying the subscriber to be input by a user who rides in a vehicle; and an output control program for realizing a function for controlling an output of information on the point of the subscriber retrieved by the retrieval program on the basis of the telephone number and the specific information for specifying the subscriber to be input by the user who rides in the vehicle.

* * * * *